United States Patent Office 2,830,932
Patented Apr. 15, 1958

2,830,932
N,N'DIBENZYLETHYLENE DIAMINE SALT OF HEPARIN

Ira B. Cushing and Edward J. Kratovil, Waukegan Township, Lake County, and Anthony F. De Rose, Chicago, Ill., assignors to Abbott Laboratories, North Chicago, Ill., a corporation of Illinois No Drawing. Application December 6, 1952
Serial No. 324,604

1 Claim. (Cl. 167—74)

This invention relates to a new heparin preparation which is characterized by long duration of heparin action and to a process for the manufacture thereof.

The invention also relates to an aqueous suspension containing the N,N'-dibenzylethylene diamine salt of heparin to be used in veterinary medicine.

We have found that the N,N'-dibenzylethylenediamine salt of heparin is relatively insoluble in water and displays a high activity with a long lasting heparin effect. The compound is relatively free from undesirable characteristics and may be used alone or in combination with other heparin preparations. The N,N'-dibenzylethylenediamine salt of heparin may be prepared by reacting N,N'-dibenzylethylenediamine with heparin in the manner described hereinafter in the examples. The useful material separates from the reaction medium and may be filtered, washed, and dried.

The following examples are presented in order to disclose the invention more clearly, but they are not intended to be a limitation of the invention. The proportions are in parts by weight unless otherwise specified.

Example I

A column of IR-112 Amberlite ion exchange resin in the acid form having a diameter of 2 cm. and a depth of resin bed of 40 cm. was prepared. The column was cooled to about 0° C. and a solution of 9 gms. of sodium heparin (having a sulfur content of 11.6% and an anticoagulant potency of about 130 units/mg.) in 900 cc. of water was passed through the column at a slow rate. The effluent which is heparin in the free acid form, was allowed to drop into a stirred solution of 7 grams of N,N'-dibenzylethylenediamine in 100 ml. of ethyl alcohol. The heparin addition was stopped when the pH of the mixture fell to 5. The suspension was concentrated in vacuum at 20 mm. pressure and at a bath temperature of about 45° C. to a volume of about 100 ml. The residual thick suspension was frozen and was dried by lyophilization. The weight of the salt recovered by this process was 15.5 grams. It had a sulfur content of 7.74%, indicating a heparin content of about 63% by weight.

Example II 10 grams of sodium heparin having a potency of 125 units/mg. was dissolved in 100 cc. of water. A 20% aqueous solution of N,N'-dibenzylethylenediamine acetate was added gradually to the heparin solution. When about 125 cc. of acetate solution had been added, further small additions produced no further precipitate. The precipitate was centrifuged and was washed with 25 cc. of water and the suspension again centrifuged. The thick paste was lyophilized to a fine white powder which weighed about 12 grams. The in vitro potency of the salt was 77 units/mg. which indicated a heparin content of about 60% by weight.

A pharmaceutically acceptable product suitable for injection was prepared by passing the N,N'-dibenzylethylenediamine salt of heparin previously prepared through a 200 mesh screen. The salt with a suitable amount of an antiseptic such as methyl parahydroxybenzoate, was mixed with sufficient water to give a heparin content of about 15,000 anticoagulant units/cc. of suspension. The salt suspended readily in water. The suspension was sterilized and packaged in ampules in the usual fashion. Through the use of such a preparation it is possible to produce a duration of anticoagulant action which is at least 50% greater than that obtainable from the same number of units of sodium heparain.

Others may vary this invention in such ways as will be suggested to one skilled in the art. Such variations are intended to be included hereunder, provided that they fall within the scope of the appended claim.

We claim:

The relatively water insoluble heparin salt of N,N'-dibenzylethylenediamine having a heparin content of about 60% by weight.

References Cited in the file of this patent

UNITED STATES PATENTS

| | | |
|---|---|---|
| 2,515,898 | Rhodehamel | July 18, 1950 |
| 2,552,507 | O'Keeffe et al. | May 15, 1951 |
| 2,561,384 | Lee et al. | July 24, 1951 |
| 2,627,491 | Szabo | Feb. 3, 1953 |

OTHER REFERENCES

Hoffman: Seattle Post Intelligencer, pp. 1 and 3, Nov. 22, 1951.

Scott et al.: Trans. Roy. Soc. Ca., 3rd Ser., May 1942, pp. 49–51.

MacIntosh: J. Pharmacol. 1, 360 (1949).